(12) United States Patent
Chang (10) Patent No.: US 11,583,967 B2
(45) Date of Patent: Feb. 21, 2023

(54) TOOL HOLDER HOLDING AND LOOSENING DEVICE OF CHAIN-TYPE TOOL MAGAZINE OF MACHINE TOOL

(71) Applicant: SANJET INTERNATIONAL CO., LTD., Taichung (TW)

(72) Inventor: Ching-San Chang, Taichung (TW)

(73) Assignee: SANJET INTERNATIONAL CO., LTD., Taichung (TW)

( * ) Notice: Subject to any disclaimer, the term of this patent is extended or adjusted under 35 U.S.C. 154(b) by 0 days.

(21) Appl. No.: 17/374,284

(22) Filed: Jul. 13, 2021

(65) Prior Publication Data

US 2022/0088732 A1 Mar. 24, 2022

(30) Foreign Application Priority Data

Sep. 21, 2020 (TW) .................. 109132540

(51) Int. Cl.
*B23Q 3/155* (2006.01)
*B23Q 3/157* (2006.01)

(52) U.S. Cl.
CPC ...... *B23Q 3/15724* (2016.11); *B23Q 3/15526* (2013.01); *B23Q 2003/15527* (2016.11); *Y10T 483/1809* (2015.01); *Y10T 483/1891* (2015.01)

(58) Field of Classification Search
CPC ........ Y10T 483/1809; Y10T 483/1891; B23Q 2003/15527; B23Q 3/15724
USPC .................................................... 483/59, 68
See application file for complete search history.

(56) References Cited

U.S. PATENT DOCUMENTS

| 3,530,570 | A | * | 9/1970 | Shotter | ................ B23Q 3/1554 483/53 |
| 3,727,301 | A | * | 4/1973 | Tsuzuki | ............. B23Q 3/15533 211/1.56 |
| 4,726,282 | A | * | 2/1988 | LaBair | ................ F15B 15/2869 92/159 |

(Continued)

FOREIGN PATENT DOCUMENTS

| CN | 103567795 A | 2/2014 |
| CN | 106624942 A | 5/2017 |

(Continued)

OTHER PUBLICATIONS

Extended European Search Report for European Application No. 21185325.4, dated Dec. 20, 2021.

(Continued)

*Primary Examiner* — Boyer D Ashley
*Assistant Examiner* — Michael Vitale
(74) *Attorney, Agent, or Firm* — Birch, Stewart, Kolasch & Birch, LLP (57) ABSTRACT

A tool holder holding and loosening device of chain-type tool magazine of a machine tool is disclosed. A locking mechanism is disposed on a rear end of each of sockets in a tool magazine. The locking mechanism is adapted to abut against an end of a tool holder mounted in the socket, thereby to prevent the tool holder from accidentally loosing. A tool loosening device is disposed on a predetermined position of the chain-type tool magazine. The tool loosening device is adapted to unlock the locking mechanism of the tool magazine passing through the predetermined position, so that the tool holder could be easily taken out of the socket.

5 Claims, 10 Drawing Sheets

(56) References Cited

U.S. PATENT DOCUMENTS

| | | | | |
|---|---|---|---|---|
| 5,018,265 A * | 5/1991 | Winkler | ............. | B23Q 3/15773 |
| | | | | 483/59 |
| 5,704,885 A * | 1/1998 | Lee | ................... | B23Q 3/15526 |
| | | | | 483/65 |
| 6,428,454 B1 * | 8/2002 | Yokota | ............... | B23Q 3/15724 |
| | | | | 483/68 |
| 9,789,576 B2 * | 10/2017 | Lechleiter | ............. | B23B 31/263 |

FOREIGN PATENT DOCUMENTS

| | | | | |
|---|---|---|---|---|
| CN | 110671364 A | | 3/2020 | |
| DE | 2109536 A1 * | | 10/1971 | |
| EP | 308822 A * | | 3/1989 | ......... B23Q 3/15526 |
| EP | 734804 A1 * | | 10/1996 | ........... B23B 29/046 |
| EP | 2689888 A2 | | 1/2014 | |
| FR | 2366097 A1 * | | 4/1978 | |
| JP | 4939176 A | | 4/1974 | |
| JP | 53-29482 U | | 3/1978 | |
| JP | 61-168445 A | | 7/1986 | |
| JP | 2005-28549 A | | 2/2005 | |
| JP | 2014-37050 A | | 2/2014 | |
| JP | 2019-18266 A | | 2/2019 | |
| KR | 100761192 B1 * | | 9/2007 | |
| TW | M586190 U | | 11/2019 | |
| TW | M606496 U | | 1/2021 | |

OTHER PUBLICATIONS

Taiwanese Search Report for Taiwanese Application No. 109132540, dated Dec. 28, 2021, with English translation.

* cited by examiner

TOOL HOLDER HOLDING AND LOOSENING DEVICE OF CHAIN-TYPE TOOL MAGAZINE OF MACHINE TOOL

BACKGROUND OF THE INVENTION

Technical Field

The present invention relates generally to a machine tool, and more particularly to a tool holder holding and loosening device of chain-type tool magazine of a machine tool.

Description of Related Art

A plurality of sockets is disposed on a chain of a conventional chain-type tool magazine of a machine tool, wherein a tool holder is mounted in the sockets and is engaged with a tool. By driving the chain to revolve, the position of the tool holder can be changed, an appropriate tool can be correctly taken during subsequent tool-taking operation.

However, after the tool holder is inserted into the socket, in order to prevent the tool holder from accidentally disengaging from the socket during the process of revolving with the chain which causes damage to the tool holders or tools or security problems, a fastening structure is usually disposed inside a conventional socket suitable for a chain-type tool magazine, wherein the fastening structure is adapted to fasten an end of the tool holder mounted in the socket, thereby to prevent the tool holder from accidentally loosing. The fastening structure is formed by a plurality of springs and a plurality of steel balls, wherein the spring exerts a pushing force on the steel ball to urge the steel ball to abut against an end of the tool holder inserting into the socket. In addition, the conventional fastening structure usually uses a spring with a greater material rigidity to increase the force that the steel ball abuts against the tool holder so as to ensure that the tool holder is stably mounted in the socket. However, when a user is about to take out the tool holder from the socket, the user has to apply a larger force to overcome the force exerted by the spring, which not only increases the difficulty of taking the tool holder out but also may cause a problem of inadequate control of the force of taking the tool holder and hurting the user.

BRIEF SUMMARY OF THE INVENTION

In view of the above, the primary objective of the present invention is to provide a tool holder holding and loosening device of a chain-type tool magazine of a machine tool, which could increase a stability when the tool holder is mounted in the socket, and the tool holder could be easily taken out.

The present invention provides a tool holder holding and loosening device of chain-type tool magazine of a machine tool, wherein the chain-type tool magazine includes a chain formed by mutually connecting a plurality of moving units. Each of the moving units is engaged with a socket. Each of the sockets has a joint hole. An end of each of a plurality of tool holders forms a pull stud. Each of the tool holders is inserted into the joint hole of one of the sockets via a front end of the corresponding socket by aligning the pull stud of each of the tool holders with the joint hole of one of the sockets. A rear end of each of the sockets opposite to the front end is engaged with a locking mechanism. The locking mechanism includes at least one operating member and at least one restricting member, wherein the operating member is movable between a first position and a second position in a first direction. The restricting members are movable between a third position and a fourth position in a second direction. When the operating member is at the first position, the operating member pushes the restricting members, thereby to remain the restricting members in the third position, and a part of each of the restricting members abuts against the pull stud, thereby to restrict the tool holder from exiting the joint hole. A tool loosening device is disposed on a predetermined position of the chain-type tool magazine. The tool loosening device includes an unlocking member. The unlocking member is manipulated to drive the operating member to move from the first position to the second position, so that the restricting members are movable between the third position and the fourth position. When the restricting members are at the fourth position, the tool holder is freely enter or exit the joint hole.

With the aforementioned design, the stability of the tool holder mounted in the socket could be ensured, and the locking mechanism could be unlocked by controlling the tool loosening device, thereby to easily take out the tool holder.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
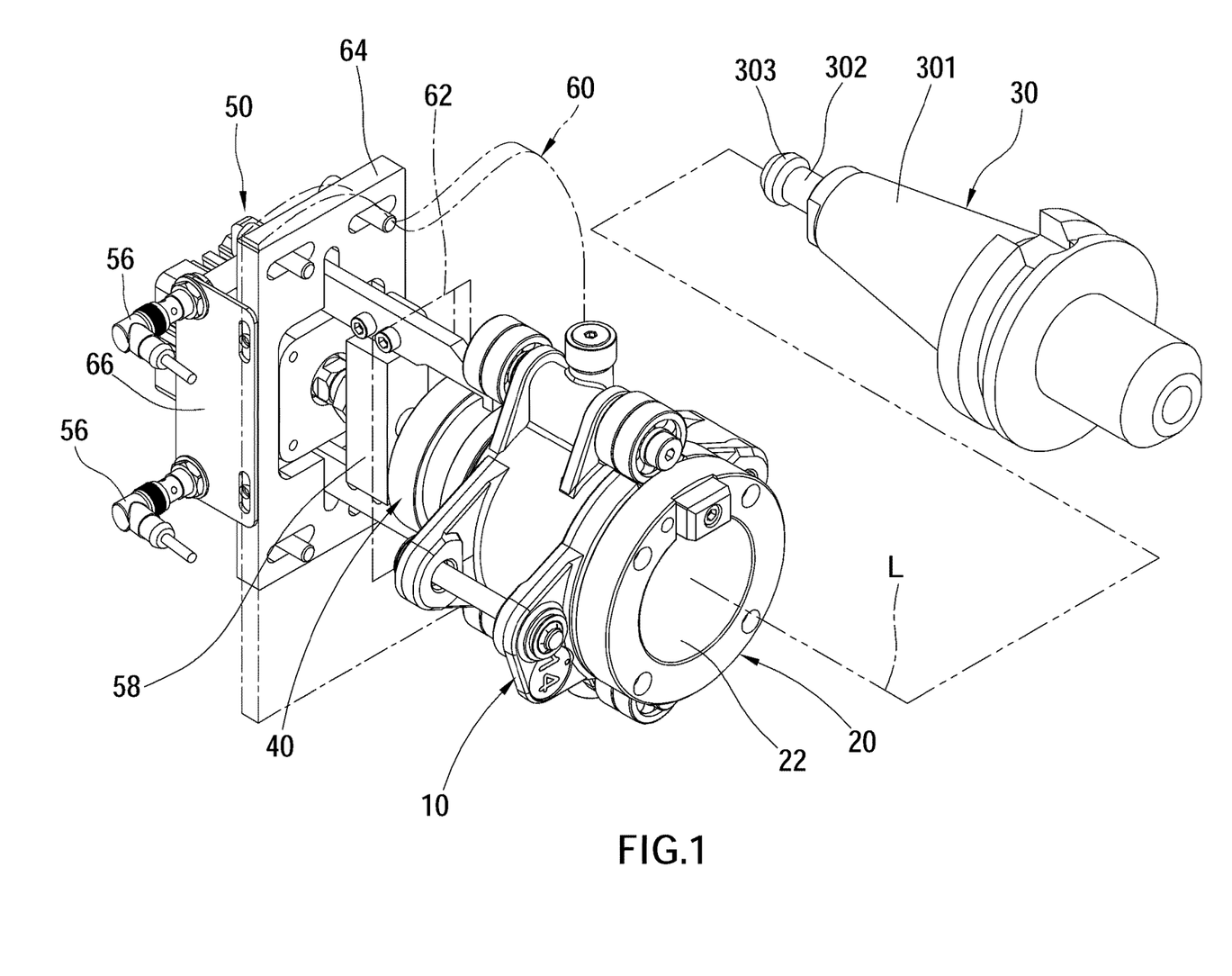
FIG. 1 is a perspective view of the tool holder holding and loosening device of the chain-type tool magazine of the machine tool according to a first embodiment of the present invention.

A tool holder holding and loosening device according to the embodiment of the present invention is applied to a chain-type tool magazine of a machine tool, wherein the chain-type tool magazine includes a chain formed by mutually connecting a plurality of moving units, and the chain is controlled to revolve along a predetermined track. As shown in FIG. 1, showing a moving unit 10 is engaged with a socket 20, the socket 20 is a cylinder with a conical joint hole 22 therein. An axis L passing through a center of the joint hole 22 is defined, and a tool holder 30 enters or exits the joint hole 22 along the axis L. The tool holder 30 includes a rod body 301, a neck portion 302, and a pull stud 303, wherein a front end of the rod body 301, which is opposite to the pull stud 303, is adapted to fix a tool (not shown). An outer diameter of the pull stud 303 is larger than an outer diameter of the neck portion 302. The tool holder 30 is inserted into the socket 20 via a front end of the socket 20 by aligning the pull stud 303 with the joint hole 22.

Figure 2:
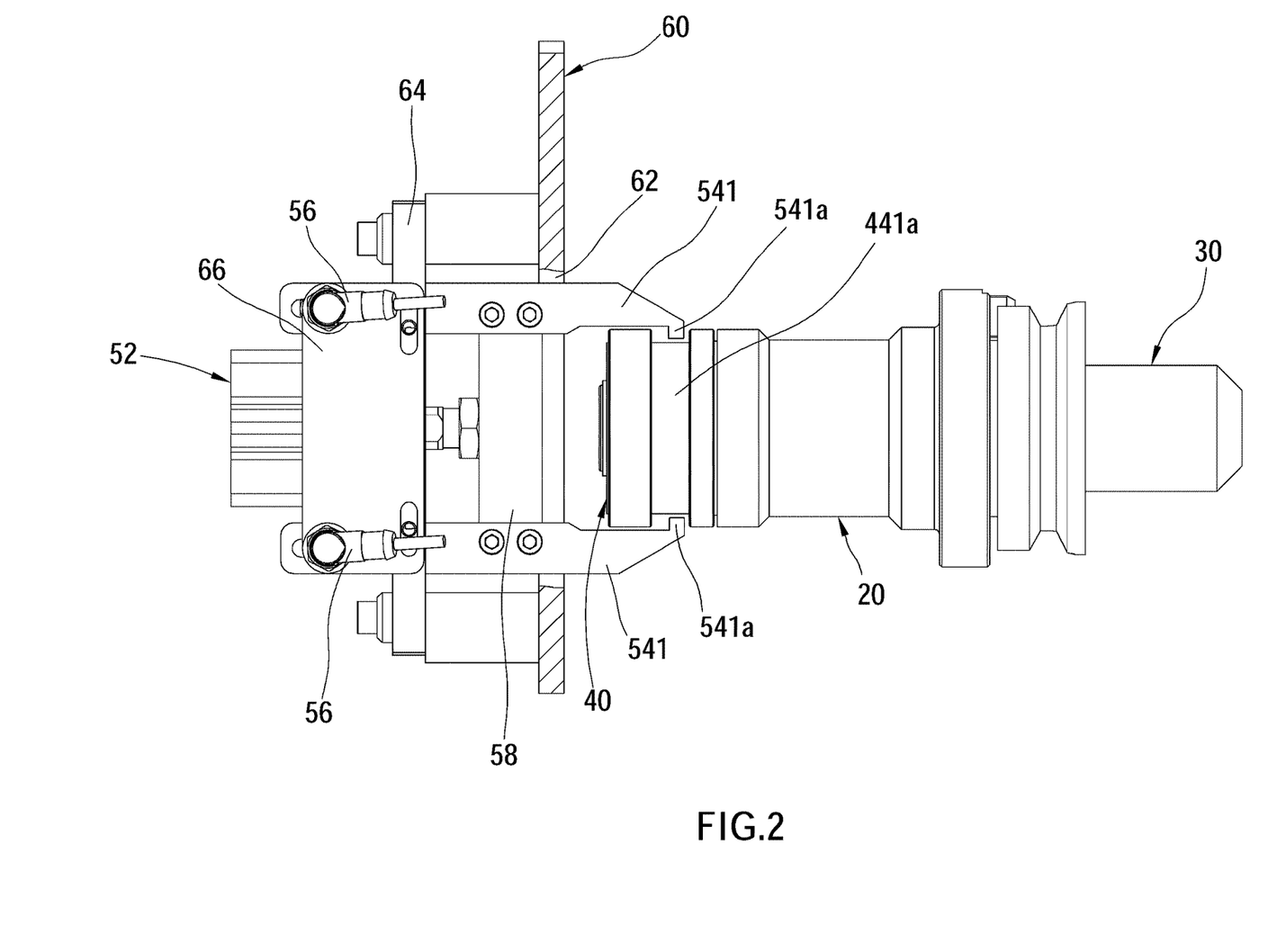
FIG. 2 is a side view of FIG. 1, wherein the moving units are omitted.
Figure 3:
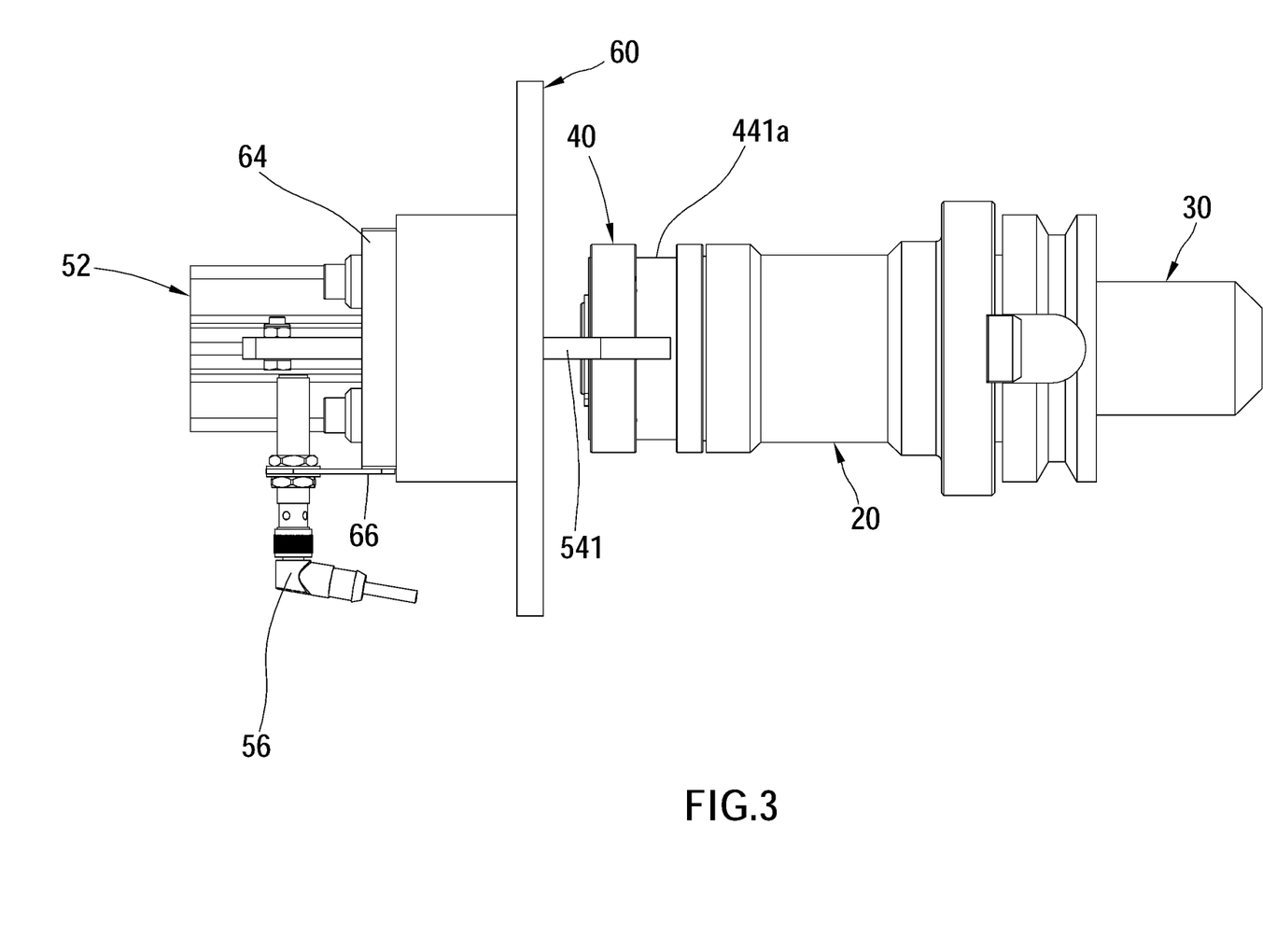
FIG. 3 is a top view of FIG. 1, wherein the moving units are omitted.

As shown in FIG. 2 and FIG. 3, in the current embodiment, the tool holder holding and loosening device includes a locking mechanism 40 engaged with a rear end of each of the sockets 20 and a tool loosening device 50 disposed on a predetermined position corresponding to the chain, wherein the rear end of the socket 20 is opposite to the front end of the socket 20. The predetermined position indicates that the socket 20 stays at a specific position for allowing the user to insert or take out the tool holder 30 from the specific position. The locking mechanism 40 which is adapted to hold and restrict the tool holder 30 and the tool loosening device 50 which is adapted to remove a restriction that the locking mechanism 40 provides on the tool holder 30 to allow the tool holder 30 to exit from the socket 20 are going to be described later.

Figure 4:
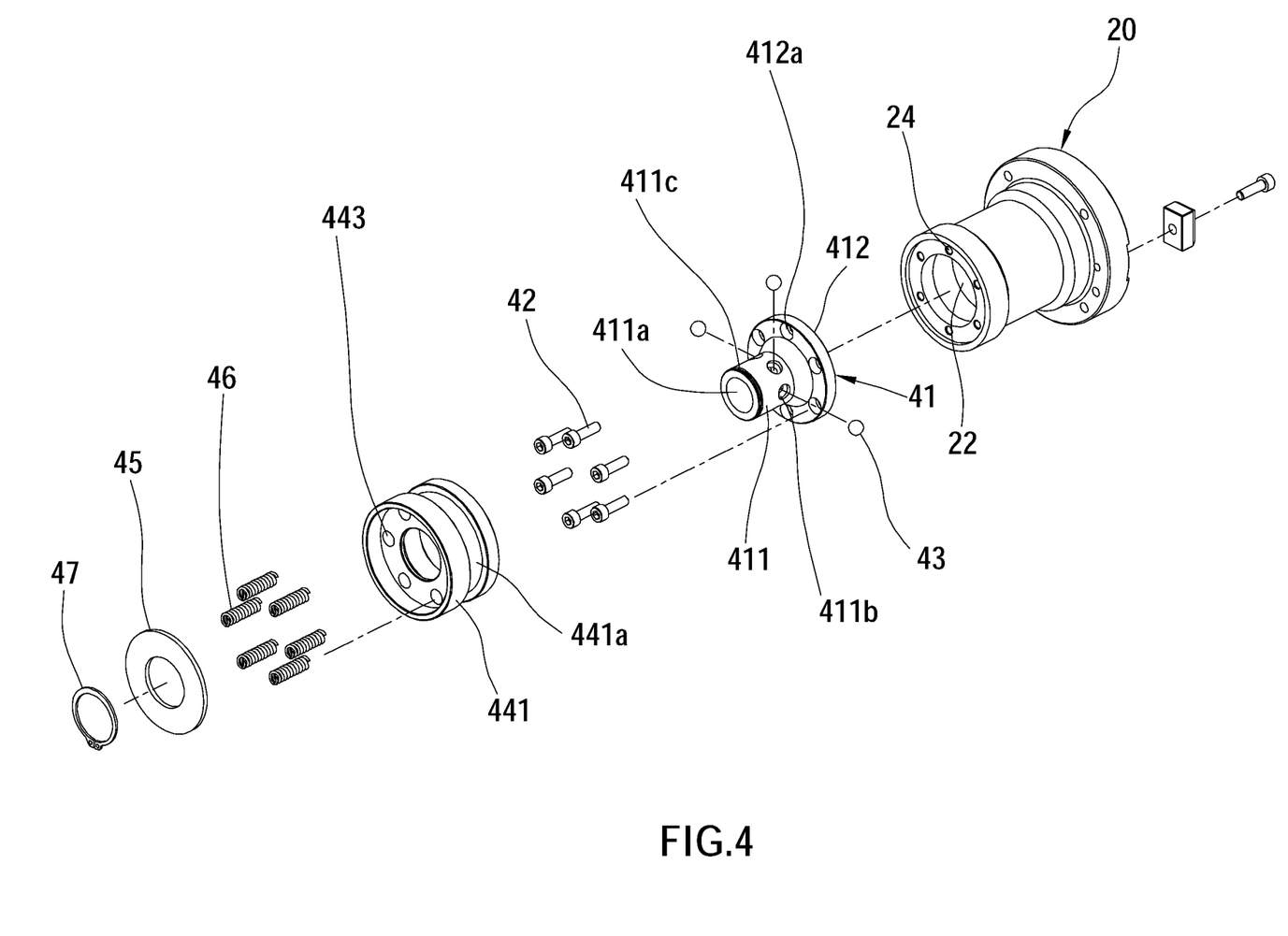
FIG. 4 is an exploded view, showing the locking mechanism and the socket of the tool holder holding and loosening device according to the embodiment of the present invention.
Figure 5:
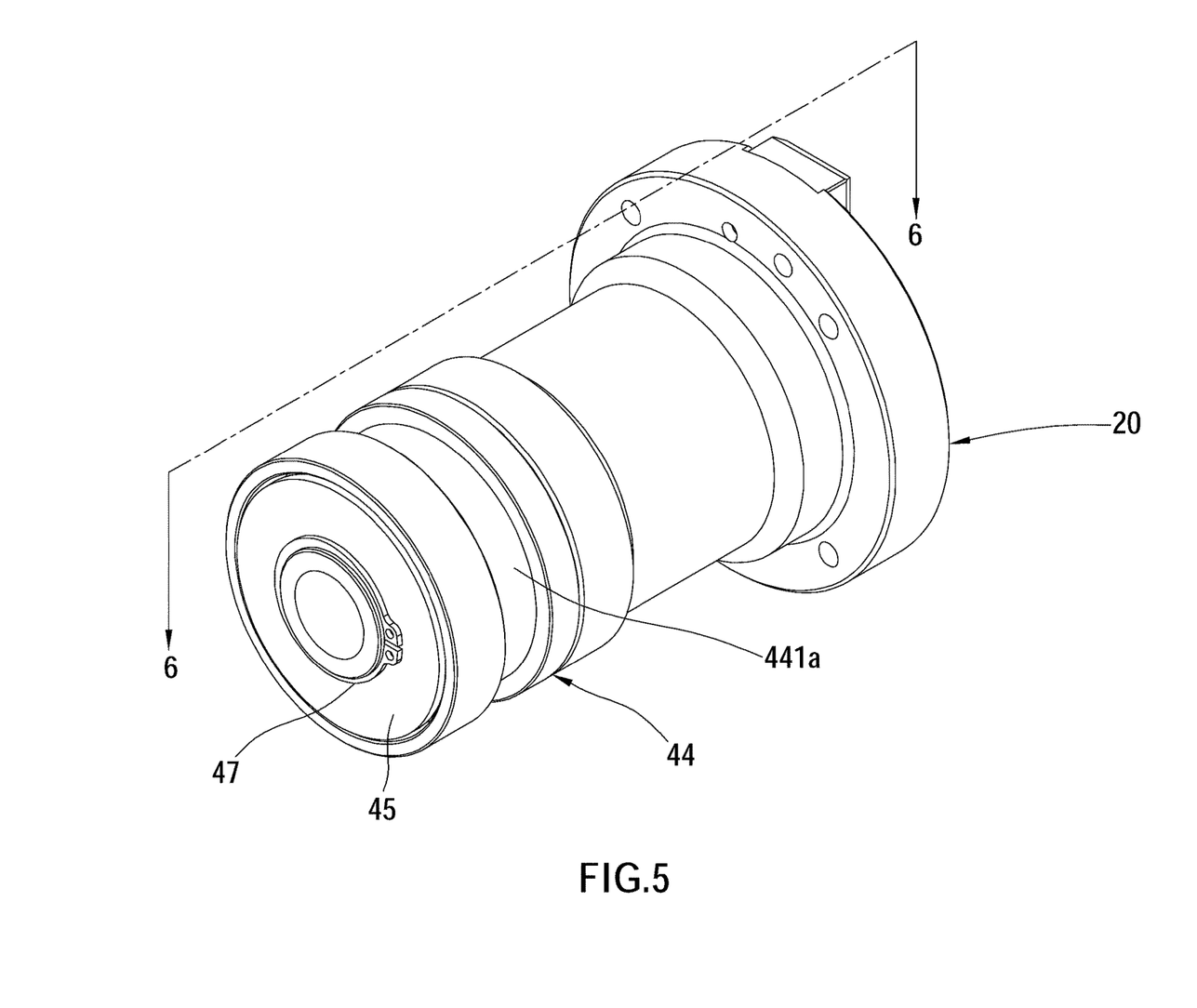
FIG. 5 is a perspective view, showing the locking mechanism and the socket shown in FIG. 4 are assembled.
Figure 6:
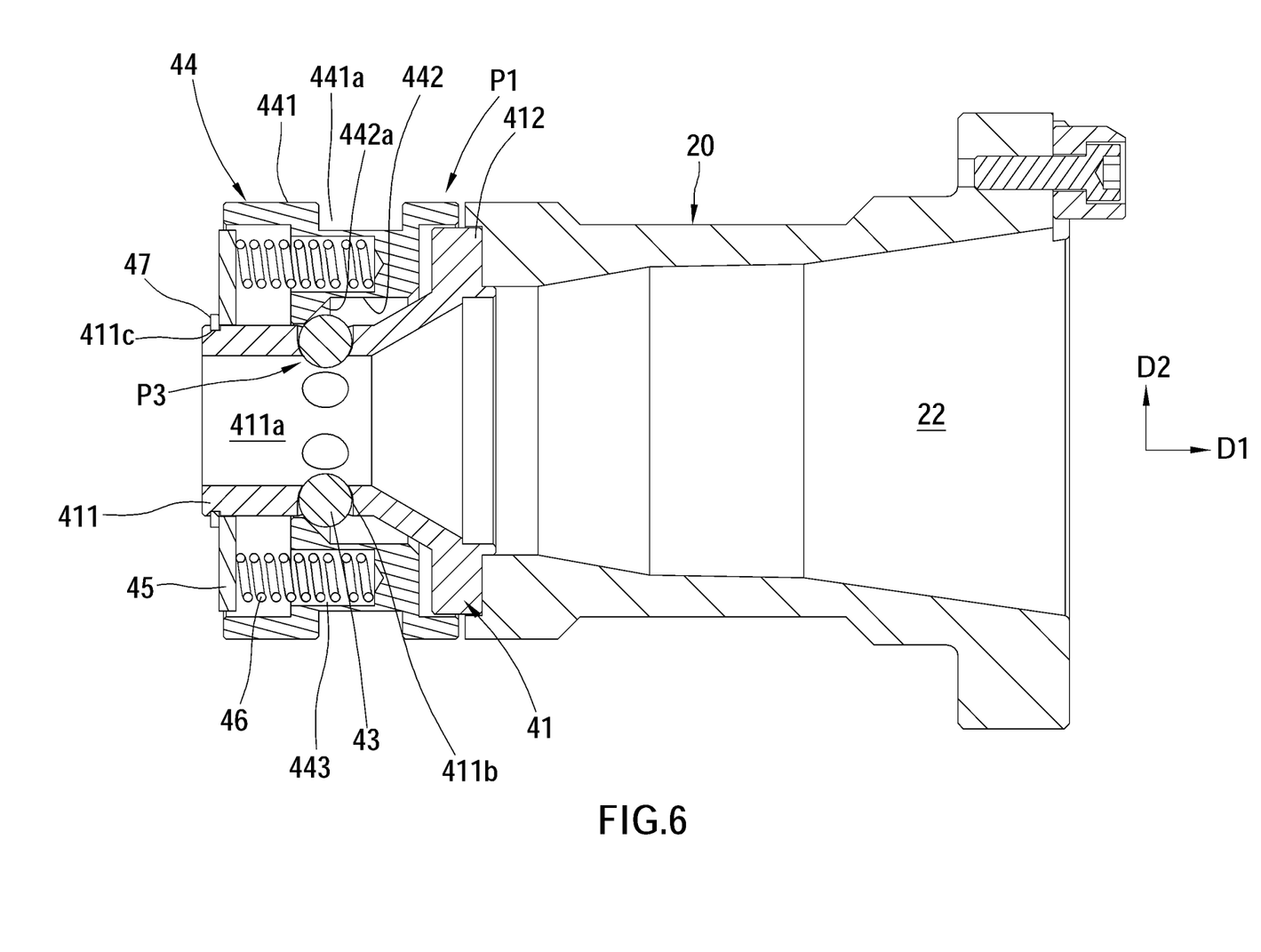
FIG. 6 is a sectional view along the 6-6 line in FIG. 5.

As shown in FIG. 4 to FIG. 6, in the current embodiment, the locking mechanism 40 includes an engaging base 41, a plurality of bolts 42, a plurality of restricting members 43, an operating member 44, a cover plate 45, and a plurality of pushing members 46, wherein the engaging base 41 has an axial tube 411 which is circular, and an end of the axial tube 411 has a flange 412 extending outward from a peripheral edge of the axial tube 411 in a radial direction of the axial tube 411. The axial tube 411 has an axial hole 411a. The flange 412 has a plurality of perforations 412a thereon. Each of the bolts 42 correspondingly passes through one of the perforations 412a and then is screwed into one of a plurality of threaded holes 24 formed on a rear end surface of the socket 20, thereby engaging the engaging base 41 with the rear end of the socket 20, wherein the axial hole 411a of the axial tube 411 communicates with the joint hole 22. In addition, a tube wall of the axial tube 411 has at least one through hole 411b communicating with the axial hole 411a. In the current embodiment, the at least one through hole 411b includes a plurality of through holes 411b, wherein each of the restricting members 43 is received in one of the through holes 411b. The restricting members 43 are steel balls in the current embodiment. In addition, a recess 411c is disposed at an end of the axial tube 411 which does not connect to the flange 412.

The operating member 44 of the locking mechanism 40 is an annular body having an outer annular surface 441 and an inner annular surface 442 and fits around an outer periphery of the axial tube 411 and is movable along a first direction D1, wherein the first direction D1 is an axial direction passing through a center of the socket 20. The cover plate 45 also fits around the outer periphery of the axial tube 411, so that the operating member 44 is located between the cover plate 45 and the flange 412 in the axial direction passing through the center of the socket 20. The cover plate 45 is resisted from disengaging from the axial tube 411 by a blocking member 47, wherein the blocking member 47 is disposed in the recess 411c. An annular groove 441a is recessed into the outer annular surface 441 of the operating member 44. The inner annular surface 442 has an abutting surface 442a which is slanted relative to an axial direction of the operating member 44. A side end surface of the operating member 44 facing the cover plate 45 has a plurality of counterbores 443, wherein the counterbores 443 are located between the outer annular surface 441 and the inner annular surface 442 in a radial direction of the operating member 44. In the current embodiment, the pushing members 46 are springs, wherein an end of each of the pushing members 46 correspondingly abuts against a bottom surface of one of the counterbores 443, and another end of each of the pushing members 46 abuts against the cover plate 45. A pushing force that the pushing members 46 exerts on the operating member 44 urges the operating member 44 to move toward a direction away from the cover plate 45. As shown in FIG. 6, when the abutting surface 442a of the operating member 44 moving in the direction away from the cover plate 45 pushes the restricting members 43, and when only a part of each of the restricting members 43 protrudes from the axial hole 411a due to the restricting members 43 being restricted by a diameter of the through holes 411b, the operating member 44 is located at a first position P1, and the restricting members 43 are remained at a third position P3. In such state, when the tool holder 30 is inserted into the socket 20 and the pull stud 303 is inserted into the axial hole 411a, the restricting members 43 partially abut against the pull stud 303, thereby to restrict the tool holder 30 from exiting the socket 20.

It is worth mentioning that, in the aforementioned embodiment, the locking mechanism 40 includes a plurality of the restricting members 43 and a plurality of the pushing members 46. However, in a situation without affecting the existing functions, the locking mechanism 40 could include only one restricting member 43 and one pushing member 46 in other embodiments.

Figure 7:
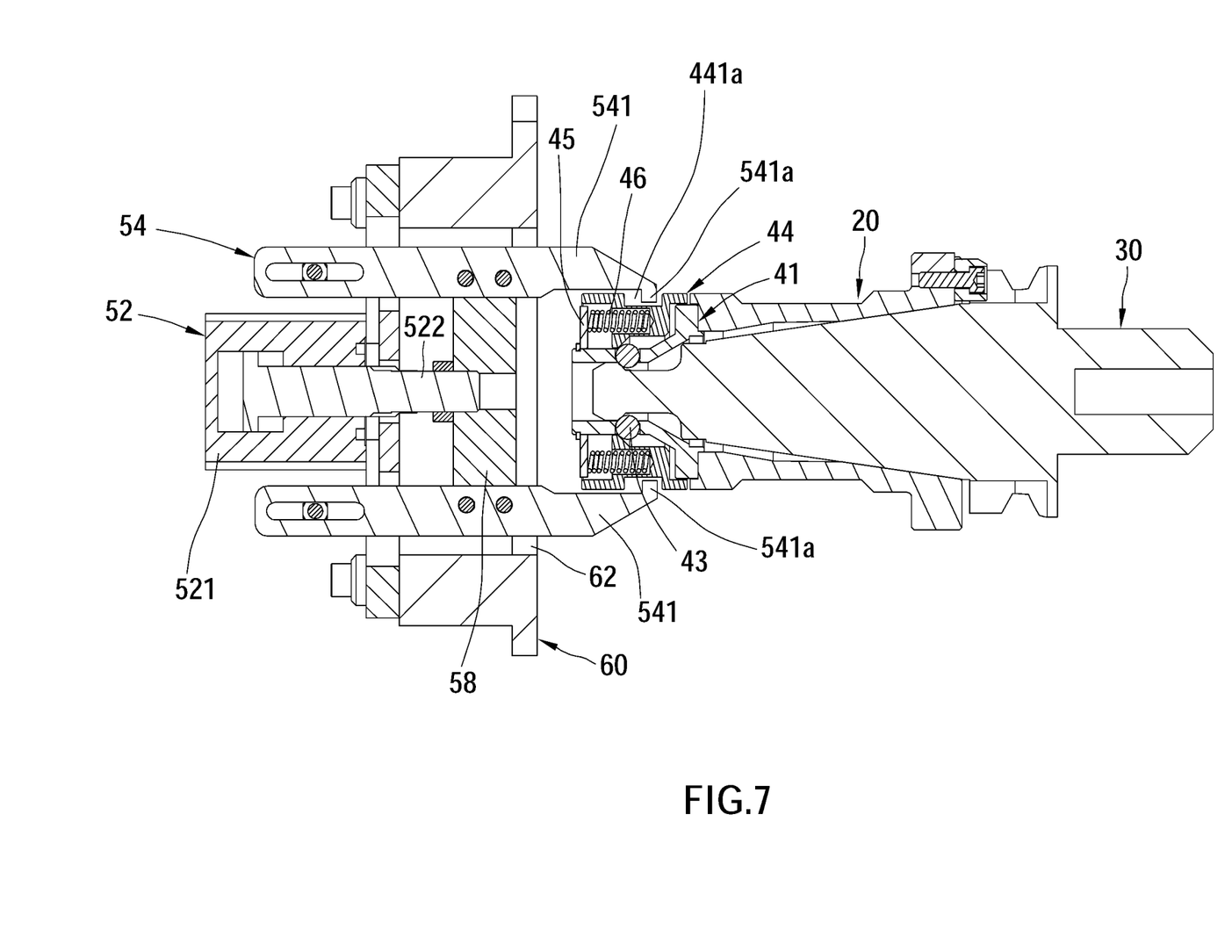
FIG. 7 is a sectional view, showing the locking mechanism of the tool holder holding and loosening device provides a restrict effect to the tool holder according to the embodiment of the present invention.

As shown in FIG. 2, FIG. 3, and FIG. 7, the tool loosening device 50 is fixed on a base 60 behind the chain, wherein the base 60 has an opening 62. The tool loosening device 50 includes a telescopic cylinder 52, an unlocking member 54, and two proximity switches 56, wherein the telescopic cylinder 52 includes a cylinder body 521 and a piston rod 522. The cylinder body 521 is fixed on a back of the base 60 facing the telescopic cylinder 52 through a support 64. A part of the piston rod 522 is located in the cylinder body 521, and another part of the piston rod 522 protrudes out of the cylinder body 521. The piston rod 522 is manipulatable to be moved back and forth along an axial direction of the opening 62 of the base 60, wherein the another part of the piston rod 522 that protrudes out of the cylinder body 521 is connected to a linkage block 58. The linkage block 58 is connected to both of two claw hooks 541 that forms the unlocking member 54, wherein the claw hooks 541 are parallel to each other. A front end of each of the claw hooks 541 forms a hook portion 541a and penetrates through the opening 62 of the base 60. As shown in FIG. 2 and FIG. 7, the piston rod 522 protrudes outward relative to the cylinder body 521 and stays in a standby state. At this time, the hook portion 541a of each of the claw hooks 541 is located in the annular groove 441a of the operating member 44 of the locking mechanism 40, and does not touch a groove wall of the annular groove 441a, thereby the chain could smoothly drive the socket 20 to move. The proximity switches 56 are disposed on a fixing plate 66 connected to the support 64 and are adapted to detect a movement position of the claw hooks 541 and correspondingly send out a signal to control whether the telescopic cylinder 52 operates or not. The proximity switch is a known technology, thus we are not going to describe in details herein.

Figure 8:
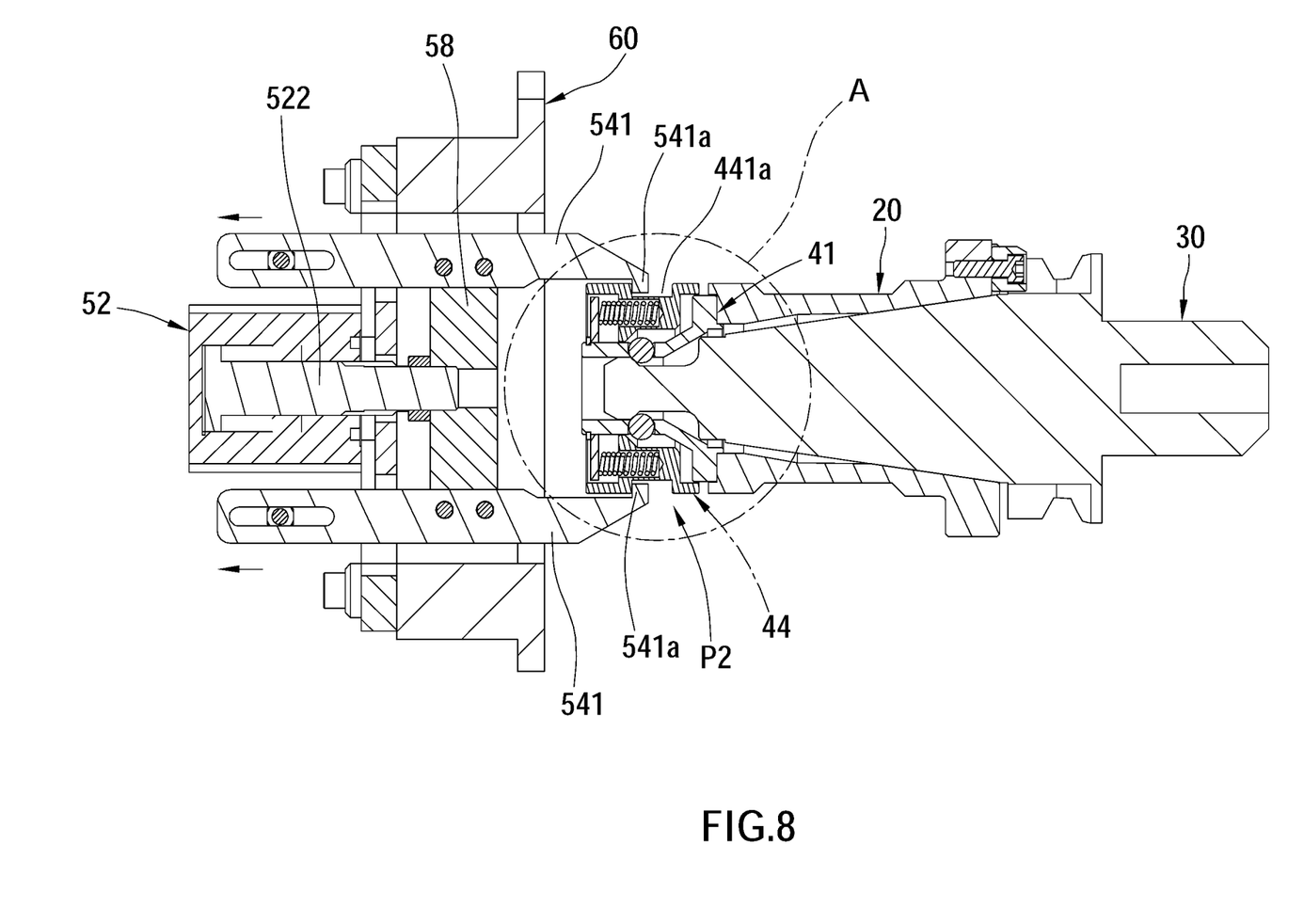
FIG. 8 is a sectional view, showing the locking mechanism of the tool holder holding and loosening device is in a state of loosening according to the embodiment of the present invention.
Figure 9:
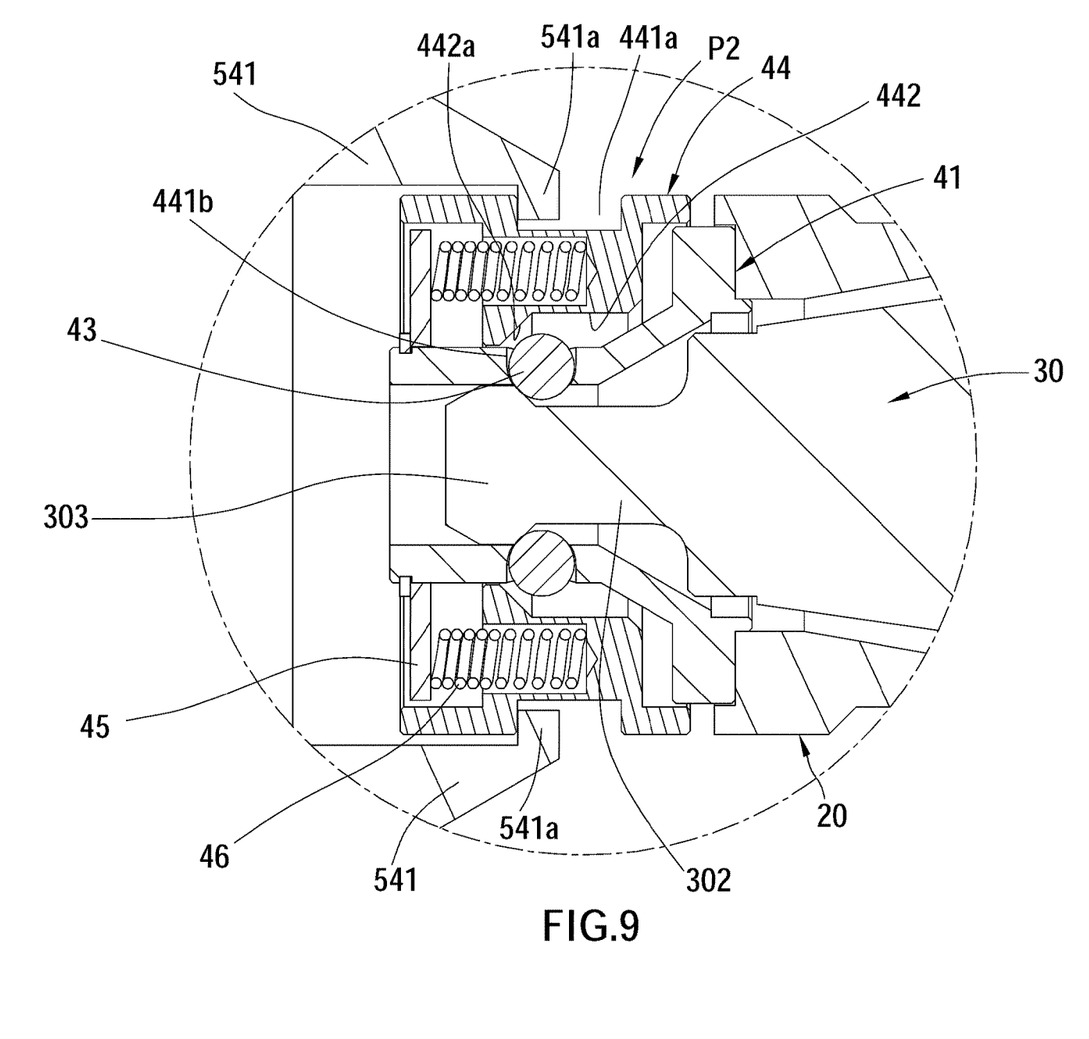
FIG. 9 is a partially enlarged view of a marked region A in FIG. 8.

When it is about to release the restriction on the tool holder 30 from the locking mechanism 40, stop revolving the chain first, and then control the piston rod 522 of the telescopic cylinder 52 moves backward (i.e., in a direction away from the base 60) inside the cylinder body 521. As shown in FIG. 8 and FIG. 9, the hook portion 541a of each of the claw hooks 541 hooks against a side groove wall of the annular groove 441a of the operating member 44. As the piston rod 522 continues to move backward, the claw hooks 541 simultaneously pulls the operating member 44 to move in a direction away from the socket 20 until one of the proximity switches 56 sends a stop control signal. At this time, the operating member 44 stays at a second position P2. At the same time, the restricting members 43 are no longer pushed by the abutting surface 442a of the operating member 44, thereby could freely move between the inner annular surface 442 of the operating member 44 and the through holes 411b; and the pushing members 46 are in a compressed state.

Figure 10:
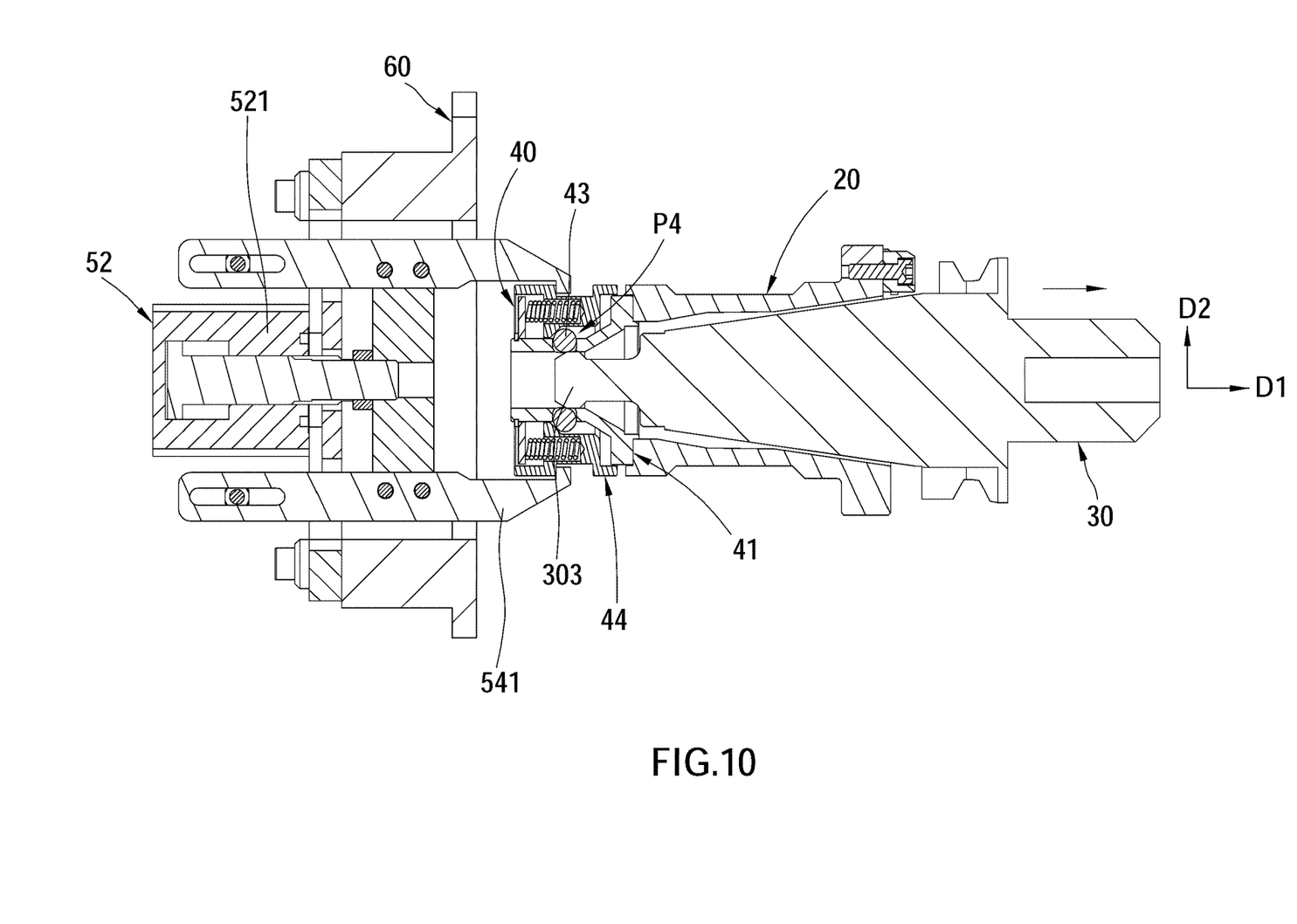
FIG. 10 is a sectional view, showing the tool holder exits from the socket.

As shown in FIG. 10, when a user pulls the tool holder 30 outwards (i.e., in a direction from the operating member 44 to the socket 20), the pull stud 303 of the tool holder 30 pushes the restricting members 43 to move along a second direction D2, wherein the second direction D2 is a radial direction of the socket 20 which is perpendicular to the axial direction passing through the center of the socket 20. When a portion of the pull stud 303 with a maximum diameter abuts against the restricting members 43, the restricting members 43 are located at a fourth position P4. Thereby, the tool holder 30 could be easily taken out without restricting by the locking mechanism 40.

In summary, with the structures that the operating member 44 is movable between the first position P1 and the second position P2 and the restricting members 43 are movable between the third position P3 and the fourth position P4, the operating member 44 forces the restricting members 43 remain at the third position P3 when the operating member 44 is at the first position P1, thereby to restrict the tool holder 30 from exiting the socket 20; otherwise, when the operating member 44 is driven by the tool loosening device 50 to move from the first position P1 to the second position P2, the restricting members 43 could freely move, especially when the restricting members 43 are pushed to the fourth position P4, the tool holder 30 could be easily pulled out of the socket 20. In this way, the tool holder holding and loosening device of the present invention not only increases the stability when the tool holder is mounted in the socket but also allows the user to take out the tool holder in a labor-saving manner, which improves the existing work safety problems that need to overcome the elastic force of the spring with a larger pulling force.

It must be pointed out that the embodiments described above are only some preferred embodiments of the present invention. All equivalent structures which employ the concepts disclosed in this specification and the appended claims should fall within the scope of the present invention.

What is claimed is:

1. A tool holder holding and loosening device of a chain-type tool magazine of a machine tool, wherein the chain-type tool magazine comprises a chain formed by mutually connecting a plurality of chain parts; each of the plurality of chain parts is engaged with a respective socket; each of the plurality of sockets has a respective joint hole; an end of each of a plurality of tool holders forms a pull stud; each of the plurality of tool holders is inserted into the joint hole of one of the plurality of sockets via a front end of the corresponding socket by aligning the pull stud of each of the plurality of tool holders with the joint hole of one of the plurality of sockets; characterized in that:

a rear end of each of the plurality of sockets opposite to the corresponding front end is engaged with a respective locking mechanism; each of the plurality of locking mechanisms comprises an engaging base, a respective operating member, at least one pushing member, and at least one restricting member, wherein each of the plurality of engaging bases is connected to the rear end of one of the plurality of sockets and has a respective axial tube; each of the plurality of axial tubes has a respective axial hole that communicates with the joint hole of one of the plurality of sockets; a tube wall of each of the plurality of axial tubes has at least one through hole communicating with the corresponding axial hole; each of the plurality of engaging bases has a respective flange extending outward from a peripheral edge of one of the plurality of axial tubes in a radial direction of the corresponding axial tube; each of the plurality of flanges is connected to the rear end of one of the plurality of sockets, a respective cover plate is disposed on an end of each of the plurality of axial tubes which is not connected to the corresponding flange; the operating member of each of the plurality of locking mechanisms is an annular body and fits around an outer periphery of the axial tube of the one of plurality of locking mechanisms, thereby the operating member of the one of plurality of locking mechanisms is movable between a first position and a second position in a first direction; the operating member of each of the plurality of locking mechanisms is located between one of the plurality of cover plates and the corresponding flange; an end of the at least one pushing member of the one of plurality of locking mechanisms abuts against one of the plurality of cover plates, and another end of the at least one pushing member of the one of plurality of locking mechanisms abuts against the corresponding operating member; a pushing force provided by the at least one pushing member of the one of plurality of locking mechanisms urges the corresponding operating member to move in the first direction toward the first position; the at least one restricting member of each of the plurality of locking mechanisms is disposed in the at least one through hole of the axial tube of the one of plurality of locking mechanisms and is movable between a third position and a fourth position in a second direction; when the operating member of one of the plurality of locking mechanisms is at the first position, the operating member of the one of plurality of locking mechanisms pushes the at least one restricting member of the one of plurality of locking mechanisms, thereby to retain the at least one restricting member of the one of plurality of locking mechanisms in the third position, and a part of the at least one restricting member of the one of plurality of locking mechanisms abuts against the pull stud of one of the plurality of tool holders, thereby to restrict the one of the plurality of tool holders from exiting the corresponding joint hole; and a tool loosening device is disposed on a predetermined position of the chain-type tool magazine; the tool loosening device comprises an unlocking member; the unlocking member is manipulated to drive the operating member of one of the plurality of locking mechanisms to move from the first position to the second position, so that the at least one restricting member of the one of plurality of locking mechanisms is movable between the third position and the fourth position; when the at least one restricting member of the one of plurality of locking mechanisms is at the fourth position, one of the plurality of the tool holders freely enters or exits the corresponding joint hole, wherein the first direction is an axial direction passing through a center of one of the plurality of sockets; and the second direction is a radial direction which extends perpendicular to the axial direction;

wherein the pull stud of each of the plurality of tool holders is able to be inserted into the axial hole of one of the plurality of axial tubes; the operating member of each of the plurality of locking mechanisms has an abutting surface; the at least one restricting member of the one of plurality of locking mechanisms is at least one steel ball; the abutting surface of the corresponding operating member touches the corresponding at least one steel ball;

wherein an annular groove is recessed into an outer annular surface of the operating member of each of the plurality of locking mechanisms; the tool loosening device comprises a telescopic cylinder; the telescopic cylinder has a piston rod which is able to move back and forth; the piston rod is connected to the unlocking member; a front end of the unlocking member forms a hook portion; the hook portion is located in the annular groove of the operating member of one of the plurality of locking mechanisms, wherein when the piston rod moves toward a predetermined direction, the unlocking member is driven to move, so that the hook portion hooks against a groove wall of the corresponding annular groove and drives the corresponding operating member to move from the first position to the second position;

wherein for each locking mechanism of the plurality of locking mechanisms, the annular groove, the at least one pushing member, the abutting surface, and the at least one restricting member are arranged in order from outside to inside along a respective radial direction of the axial hole of the axial tube.

2. The tool holder holding and loosening device of the chain-type tool magazine of the machine tool as claimed in claim 1, wherein an inner annular surface of the operating member of each of the plurality of locking mechanisms has the abutting surface which is slanted.

3. The tool holder holding and loosening device of the chain-type tool magazine of the machine tool as claimed in claim 1, wherein the unlocking member comprises two claw hooks; a front end of each of the two claw hooks has the hook portion; and an end of the piston rod is connected to the two claw hooks by a linkage block.

4. The tool holder holding and loosening device of the chain-type tool magazine of the machine tool as claimed in claim 3, wherein the tool loosening device comprises two proximity switches which are adapted to detect a movement position of the two claw hooks and correspondingly send out a signal.

5. The tool holder holding and loosening device of the chain-type tool magazine of the machine tool as claimed in claim 1, wherein the unlocking member comprises two claw hooks; a front end of each of the two claw hooks forms the hook portion; the piston rod is operatively coupled to the two claw hooks; and the two claw hooks hook against the operating member of one of the plurality of locking mechanisms to move the corresponding operating member from the first position to the second position.

* * * * *